United States Patent [19]

Weissenborn

[11] Patent Number: 4,538,744

[45] Date of Patent: Sep. 3, 1985

[54] DEVICE FOR SUPPLYING MATERIAL WITH UNIT DOSES OF PARASITICIDAL COMPOSITION

[76] Inventor: Jorg Weissenborn, 6941 Laudenbach, Fed. Rep. of Germany

[21] Appl. No.: 349,399

[22] Filed: Feb. 16, 1982

Related U.S. Application Data

[63] Continuation-in-part of Ser. No. 211,993, Dec. 1, 1980, abandoned, which is a continuation of Ser. No. 48,126, Jun. 13, 1979, abandoned.

[51] Int. Cl.³ .............................................. G01F 11/10
[52] U.S. Cl. ......................................... 222/36; 222/39; 222/370; 222/644; 340/609; 340/684
[58] Field of Search ............ 222/30, 32, 36, 37, 222/39, 370, 650, 638, 644; 221/2, 3, 15, 21, 265; 340/606, 608, 684, 609; 235/92 B; 73/223; 250/222 PC, 560; 137/551; 209/571; 361/181; 324/65 P

[56] References Cited

U.S. PATENT DOCUMENTS

| | | | |
|---|---|---|---|
| 3,332,584 | 7/1967 | Pennington | 222/370 |
| 3,537,091 | 10/1970 | Schenkenberg | 340/609 |
| 3,641,543 | 2/1972 | Rigby | 340/609 |
| 4,105,028 | 8/1978 | Sadlier et al. | 340/609 |
| 4,185,224 | 1/1980 | Thompson | 222/39 |
| 4,321,461 | 3/1982 | Walter et al. | 340/609 |

FOREIGN PATENT DOCUMENTS 520160 12/1955 Canada .............................. 340/608

OTHER PUBLICATIONS

Benedict, Electronics for Scientists and Engineers, 1967, pp. 439-440.

Primary Examiner—H. Grant Skaggs

[57] ABSTRACT

A device is provided for supplying material with unit doses of particulate parasiticidal composition, comprising, in combination:

(1) a supply of particulate parasiticidal composition;
(2) a feeder for feeding unit doses in regular sequence from the supply to the material;
(3) a capacitive approach switch for sensing each unit dose as fed to the material;
(4) a timer for timing the interval between unit doses; and
(5) a signalling device for giving a signal when the interval between doses exceeds a predetermined limit.

7 Claims, 4 Drawing Figures

4,538,744

DEVICE FOR SUPPLYING MATERIAL WITH UNIT DOSES OF PARASITICIDAL COMPOSITION

This application is a continuation-in-part of Ser. No. 211,993 filed Dec. 1, 1980, which in turn is a continuation of Ser. No. 48,126 filed June 13, 1979, both now abandoned.

German Gebrauchsmuster No. 73 052 58 describes a dosing device for supplying material such as foodstuffs with unit doses of pelleted parasiticidal composition. The device has a supply bin for the pellets, which are delivered from the supply bin in sequence, one at a time, and gravity-fed to the material. The parasiticidal composition can include phosphide as the parasiticide. This dosing device is designed to automatically feed unit doses by way of an electrically driven rotatable selector plate disposed at the bottom of the supply bin and having a plurality of pellet-sized peripheral openings. The selector plate rotates above a fixed plate having at least one pellet-size opening which can be brought into alignment, one at a time, with the openings of the selector plate. Whenever one of the openings of the selector plate is in alignment with the opening of the fixed plate, a pellet falls through the aligned openings, and is fed to the material below. The rate of rotation of the selector plate (which is adjustable within wide limits) accordingly, determines the time intervals between alignments of the openings of the selector plate with the fixed plate, and thus controls the number of pellets dosed per unit time. A scale is provided showing the actual rate of rotation, so that it is possible to select rather precisely whatever dosage rate is desired. The dosage rate, or a unit value equivalent thereto, can easily be read off the scale. If the stored material is in transit, the rate can be coordinated by a nomograph with the rate of travel of the material, so that the proper dosage of particulate parasiticidal composition will be supplied to the goods throughout the transit from the starting point to the delivery point.

However, the problem with this device is that there is no way to detect a failure to supply pellets, due, for example, to exhaustion of the supply, or to a blockage in the feed to the selector plate, nor is there any way of determining variations in the dosing rate beyond a predetermined range, which can of course lead to unchecked deterioration or destruction of the material.

German Auslegeschrift No. 1,007,553 describes a device for gravity feed of pelleted parasiticidal composition that has a selector plate which is manually operated. Whenever the plate is operated, one pellet is fed through the dispensing tube to the material. A counter is connected to the selector plate, and counts the pellets as they are fed. However, this device does not have means for showing a failure in the supply, or variations in the rate of feed beyond a predetermined range.

German Offenlegungsschrift No. 2,105,786 describes a vehicle for seeding the ground, and arranged to be driven by a tractor. The seed feeding device includes a counter, which counts every seed as it falls through the device and is fed to the ground. The counter scale is in the tractor cab, where it can be read by the operator, and under some circumstances an alarm can be given if the seed feeding is in some way unusual. However, this device is not suitable for the supplying of pelleted or similar particulate parasiticidal composition to material such as corn and similar foodstuffs.

In accordance with the invention, a device is provided for supplying unit doses of particulate parasiticidal composition, particularly pellets, to material susceptible to parasite attack, comprising, in combination:

(1) a supply of particulate parasiticidal composition;

(2) means for feeding unit doses in regular sequence from the supply to the material;

(3) means for sensing each unit dose as fed to the material;

(4) means for timing the interval between unit doses; and (5) means for giving a signal when the interval between doses exceeds a predetermined limit.

The means for sensing or detecting each unit dose gravity-fed to the material can take the form of a pulse generator which emits a pulse each time the generator senses or detects a unit dose passing to the material. This pulse is in turn transmitted to a monitoring device and a counter, which counts the pulses and at the same time times the interval therebetween, and gives a signal whenever the time interval between two succeeding pulses exceeds a predetermined interval time.

Such sensing means in a preferred embodiment of the invention is a capacitive approach switch, which is basically an oscillating circuit which is mistuned and gives a pulse whenever a body approaches or passes the switch. A commercially available capacitive approach switch is Type KA5-70-30-S of Firma Rechner Industrieelectronik, Lampertheim, West Germany.

This switch is preferably connected to a monostable sweep circuit, which in turn is connected to an integrated circuit including a timer. The timer emits a constant number of pulses per second when it is activated by a signal from the monostable sweep circuit. The monostable switch and the timer are embodied each by an integrated circuit Type 555 of Texas Instruments Company.

The switch is also preferably connected to a counter counting the pulses emitted by the switch, and keeping a tally of the total. An electromechanical counter that can be used is Type 874.1 available from Firma Hengstler KG, 7207 Aldingen, West Germany.

The device accordingly signals any aberration in the feed interval of particulate parasiticidal composition to an operator, who thereupon can made an investigation to determine the reason. Thus, if the feed is in some way blocked, the blockage can be removed; if the supply bin is empty, it can be replenished. In this way, it is possible to ensure that the parasiticidal composition is fed to the material at the desired rate for any required time, such as throughout the transit time from one location to another.

The timing interval or feed interval can be monitored by suitable adjustment of the monostable switch. By reading the counter, the operator can know the total number of doses of particulate parasiticidal composition delivered to the material and adapt the device for periodic feeding of the parasiticidal composition according to the parasiticide used, and the material that is dosed therewith.

The device is adapted for feed of particulate parasiticide of any type and size of particle. Pellets, tablets, fragments, globules, powders, granules, and chunks can be gravity-fed in any size dose, because the time for feeding is restricted to the time interval during which the openings in the selector plate and base plate are in alignment.

A preferred embodiment of the invention is shown in the drawings, in which.

Figure 1:
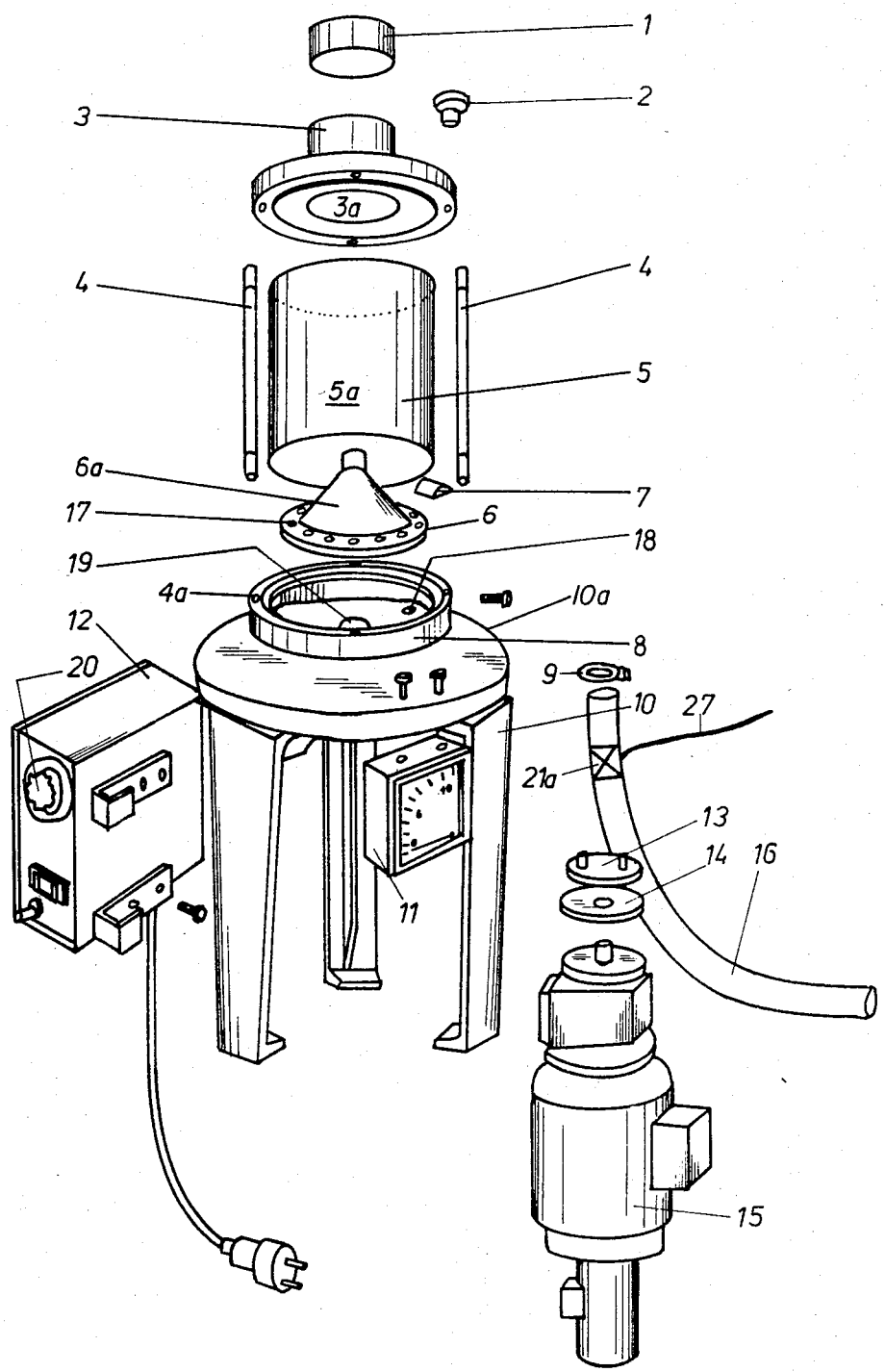
FIG. 1 is a perspective view in exploded form of a device in accordance with the invention.

As seen in FIG. 1, the assembled device of the invention is supported on the base plate 10a which is attached to the three legs 10. The base plate carries the supply bin 5 and rotatable selector plate 6 upon the annular frame 8, and also carries the plate drive and motor 15 and feed tube 16 below the plate. The frame 8 is provided with a cover 3 connected by the nuts 2 threading onto bolts 4 fitting in the threaded sockets 4a to the frame 8. Retained between the cover 3 and the frame 8 is a transparent cylinder 5 of clear plastic, such as polymethylmethacrylate (Plexiglas) with a chamber 5a therewithin, serving as the supply bin for the particulate parasiticidal composition such as pellets or powder, delivered in unit doses by the selector plate 6. In order to fill the chamber 5a with particulate parasiticide, the cover 3 has a center opening 3a, which is normally closed by the removable cover 1.

The base plate 10 has a feed opening 18, which is in alignment for selected time intervals, according to the rate of rotation of the selector plate 6, with one at a time of the feed openings 17 at the periphery of the selector plate. Whenever an opening 17 is in alignment with the opening 18, a dose of particulate material (in this case a pellet) is fed by gravity through the aligned openings to the material being dosed, which is placed below. For this purpose, a delivery tube 16 is provided, which is removably connected to the lower side of the base plate 10a beneath the opening 18 by the adjustable screw clamp 9. The tube should be flexible, to permit delivery to any desired portion of the material below.

The selector plate 6 has an upstanding frustoconical central portion 6a serving as a funnel to guide the particulate material stored in the chamber 5a to the feed openings 17. Since the material tends to be carried along by the plate 6 as it rotates, to assist in ensuring that material will be fed through the openings 17, 18 when they are in alignment, the plate passes below the scraper blade 7, which is fixed just beyond the point of alignment of openings 17, 18, just above the top of the selector plate 6, at the base of the cone 6a, and compelling material to drop through the aligned openings as it is carried against the blade 7 by the plate 6.

The selector plate 6 is rotated by the drive 15, which includes a gear unit and an electric motor. In operative connection between the plate 6 and the output axle of the gear unit is a clutch 13, together with a spacer plate 14. The output axle passes through a central opening 19 to the base plate, operatively connected via the clutch 13 with the base plate, for rotation thereof by the motor.

An electronic control device 12 is provided for operating the motor. An indicator 11 shows the rate of rotation of the selector plate 6, read off a calibrated scale.

In operation, the selector plate 6 is driven by the motor 15 at a constant rotational speed, which can be varied as desired by way of the control knob 20 of the control device 12. According to the rate of rotation of the selector plate 6, and the number of openings 17 per unit length of its periphery, the time intervals between successive delivery of the pellets through the aligned openings 17 and 18 can be adjusted as desired. The pellets are delivered by way of the tube 16 to the material, which is not shown in the drawing. By use of the nomograph, one can read off the number of pellets or the weight of particulate parasiticidal composition that is delivered, according to any particular rate of rotation of the selector plate 6, and mixed with the material according to the rate of transit of the material. A different nomograph is required for each number of openings 17 in the selector plate 6.

All of the above is known, and shown in German Gebrauchsmuster No. 73 052 58, registered July 26, 1973.

Figure 2:
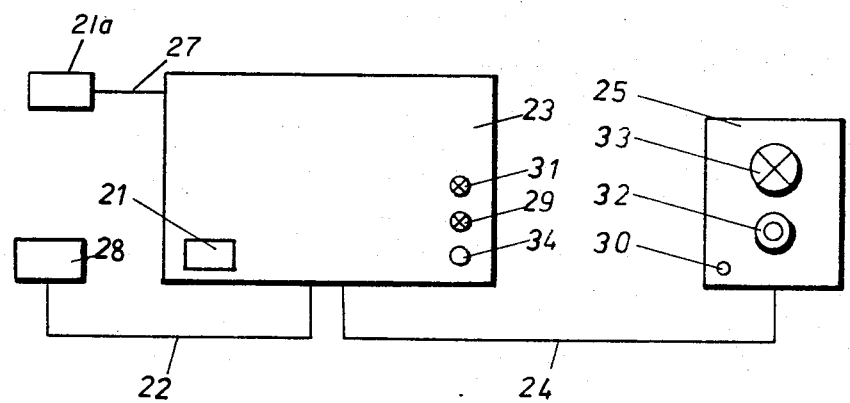
FIG. 2 is a schematic view of the pellet sensing and signalling system.
Figure 3:
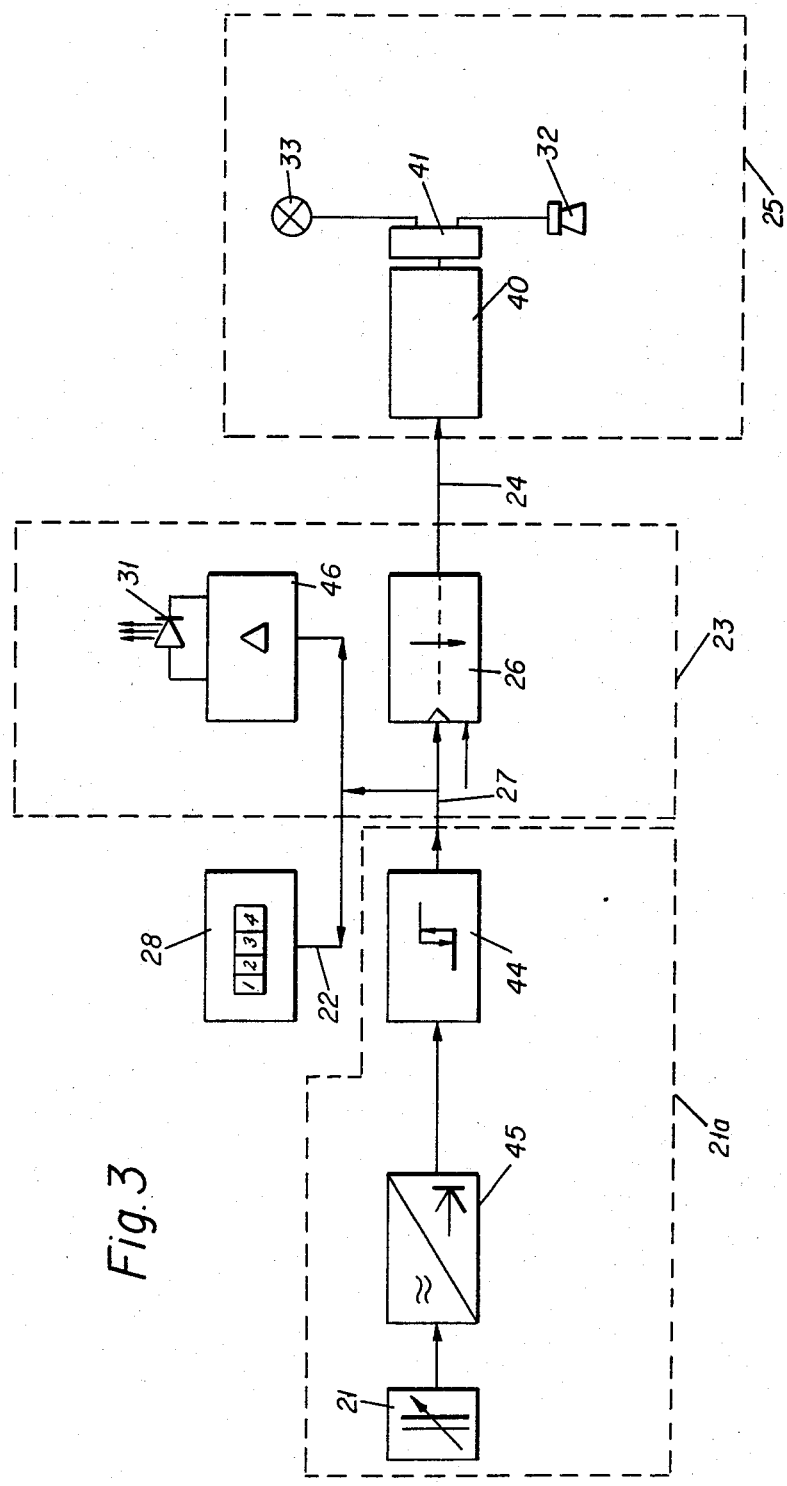
FIG. 3 is an electric circuit diagram showing the most important electric components of the device of FIG. 1.
Figure 4:
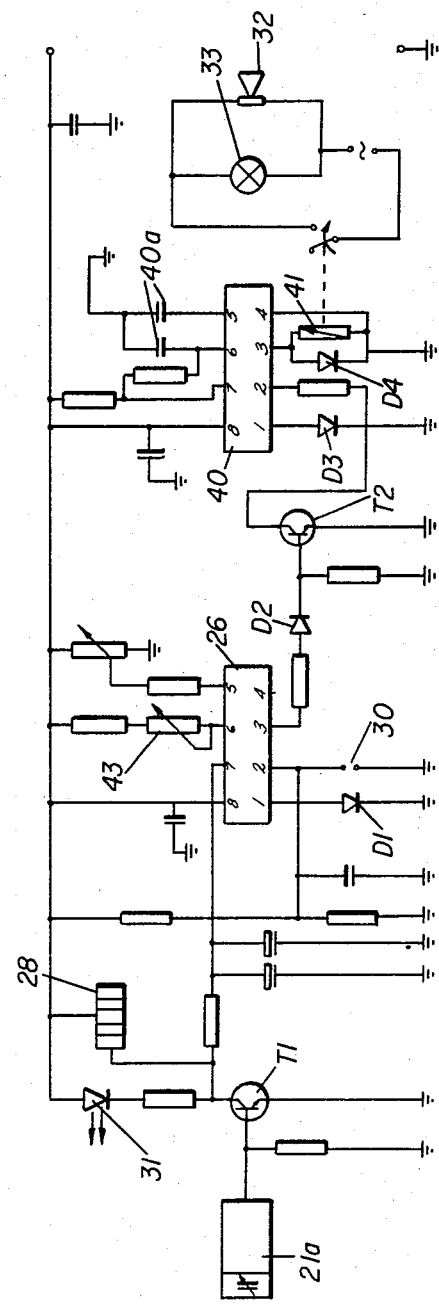
FIG. 4 is a detailed view showing the components of the electric circuit of FIG. 2.

As seen in FIGS. 2, 3 and 4 the electric circuitry of the device in accordance with the invention to monitor the feeding of parasiticidal composition includes a capacitive approach switch 21a, which encompasses a capacitive sensor 21 tuning an oscillator with rectifier 45 and a Schmitt trigger 44. The capacitive approach switch 21a is connected by a cable 27 to the monitoring device 23, and an alarm 25 connected to the device 23 by way of the cable 24. Preferably, the capacitive approach switch 21a is disposed in the wall of the tube 16 of the device seen in FIG. 1, so that it can sense material falling through the tube.

The capacitive approach switch can for example be a Type KA5-70-30-S switch, available from Rechner Industrieelecktronik, Lampertheim, West Germany.

The monitoring device 23 includes a monostable sweep circuit 26, for example, a Type A555, available from Texas Instruments, a potentiometer 43, (for example a 1MR available from Siemens) a reset button 30 (available from Siemens), transistors T1, T2 (for example, Type 2N4912 available from Motorola), diodes D1, D2 (for example, Type AN 9-198 available from ITT), and a light emitting diode 31 (for example type LD4, available from Siemens).

An electromechanical pulse counter 28 (for example, a Type 784.1 counter, available from Hengstler KG, 7207 Aldingen, West Germany) is connected to the monitoring device 23.

The signal or alarm circuit includes a timer circuit 40 (constituted essentially by a Type A555, available from Texas Instruments) and by capacitors 40a, diodes D3, D4 (for example, Type AN9-198 available from ITT), a relay 41 (for example, Type PV 23 015 available from Siemens), alarm horn 32 (220V/50–60 Hz such as a Siemens HF 2-V23302 C4002), and a signal lamp 33 (220V/6W).

In FIG. 3 the capacitive approach switch 21a with rectifier 45 and the Schmitt trigger 44 gives pulse to (1) the booster 46 and light-emitting diode 31,
(2) the electromechanical counter 28, and
(3) the monostable sweep circuit 26 whenever a pellet or dose of particulate material approaches or passes the switch 21a. The trigger 44 generates a pulse when the amplitude of the rectified oscillator exceeds a predetermined value.

In FIG. 4 the signal flow is slightly different in that the approach switch 21a controls over a booster transistor T1 the light-emitting diode 31, the electromechanical counter 28 and the monostable sweep circuit 26. The booster transistor T1 replaces the booster 46 in FIG. 3 and amplifies the signal from cable 27.

The light-emitting diode 31 glows red during each pulse, and indicates that the pellet or dose is passing the capacitive approach switch 21.

The electromechanical counter 28 counts the pulses emitted by the capacitive approach switch 21a, and the display shows the total count of pellets that pass the capacitive approach switch 21a.

In FIG. 3 the Schmitt trigger 44 retriggers the monostable sweep circuit 26 at each pulse from the capacitive approach switch 21a. Referring to FIG. 4, the monostable sweep circuit 26 can also be retriggered manually by the push button 30. The time interval constant of the monostable sweep circuit 26 is set by the potentiometer 43. If the time interval between retriggered pulses exceeds the time interval constant, then the monostable sweep circuit 26 returns to its stable condition, and a signal is given to the timer circuit 40. The timer circuit 40 gives a pulsated alarm signal via the relay 41, which lights the warning lamp 33 and sounds the alarm horn 32.

Thus, the alarm horn 32 sounds and the warning lamp 33 lights only when no pellets or other particulate material pass the capacitive approach switch 21a.

In operation, therefore, whenever a pellet or dose of particulate material descends through the delivery tube 16, the capacitance approach switch 21a gives a pulse, and the pulses are fed through the monostable sweep circuit 26. So long as the time interval between pulses is less than the time interval constant of the sweep circuit, no alarm is given. Whenever the time interval between each succeeding dose of particulate or pelleted material through the delivery line 16 exceeds the time interval constant, the sweep circuit returns to its stable condition and generates a signal in the cable 24. By this signal the timer circuit 40 is activated which gives a pulsated alarm signal via the relay 41 to the horn 32 and the light 33. The relay 41 increases the power of the alarm signal generated by the timer circuit 40 sufficiently so as to sound the horn and to illuminate the light 33.

When the monitoring device 23 is turned on, the control lamp 29 in FIG. 2 of the supply of current to the device (not shown) is illuminated. At the same time, the alarm 25 is turned on. The alarm is stopped by pressing the push button 30. The counter 28 is then set at zero, so that the total number of pellets or doses being delivered can now be counted. As each pellet is delivered at intervals less than the time interval constant of the approach switch 21a, the control lamp 31 is illuminated, and the counter 28 counts the doses, one by one. If no pellets are delivered within the time interval set by the potentiometer 43, the monostable sweep circuit 26 triggers the alarm by activating the timer circuit 40. As soon as a pellet again passes by the switch 21a, the alarm is stopped, if this had not been done previously, by pushing the push button 30.

The switch controlling the supply of current to the device is shown in FIG. 2 as 34.

The diodes D1 and D3 are provided for biasing the integrated circuits of the monostable sweep circuit 26 and the timer circuit 40. The diode D2 couples the output of the monostable sweep circuit 26 with the basis of the signal amplifying transistor T2 which gives the amplified signal to the input of the timer circuit 40. The diode D4 constitutes an overvoltage protection of the timer circuit 40 and the relay 41.

A special advantage of the device in accordance with the invention arises from the fact that the monitoring device 23, the counter 28 and the alarm 25 can be positioned at any distance desired from the dosage device shown in FIG. 1. The dosage device is usually placed in a location where there is much dust and other noise. With the monitoring device 23 in another room or in an entirely different location well spaced from this one, the person servicing the device can control it fully without interference.

Having regard to the foregoing disclosure, the following is claimed as inventive and patentable embodiments thereof:

1. A device for supplying unit doses of particulate parasiticidal composition to material susceptible to parasite attack, comprising, in combination:
   (1) a supply of particulate parasiticidal composition;
   (2) means for gravity-feeding unit doses in regular sequence at timed intervals from the supply of the material;
   (3) means for sensing each unit dose as fed to the material comprising a capacitive approach switch which gives a pulse whenever a body passes the switch, and which is in operative connection with a monostable sweep circuit, and a counter in operative connection with said capacitive approach switch, counting the pulses emitted by the capacitive approach switch, and keeping a tally of the total;
   (4) means in the monostable sweep circuit for timing the interval between unit doses, and emitting a signal whenever the time interval between two succeeding pulses exceeds a predetermined interval of time; and
   (5) means controlled by said signal for giving an alarm indicating that the time interval between two succeeding pulses exceeds said predetermined interval of time.

2. A device according to claim 1 adapted for feed of pellets of parasiticidal composition.

3. A device according to claim 1 in which the means for feeding unit doses in a regular sequence comprises an electrically driven rotatable selector plate having a plurality of openings about its periphery, and a fixed plate below the selector plate having at least one opening which can be brought into alignment one at a time with the openings of the selector plate, so that whenever one of the openings in the selector plate is in alignment with an opening of the fixed plate, particulate parasiticidal composition passes through the aligned openings as a unit dose.

4. A device according to claim 3 in which the rate of rotation of the selector plate is adjustable, and determines the time intervals between alignments of the openings in the selector plate with the fixed plate, and thus controls the number of unit doses per unit time.

5. A device according to claim 4 having a scale showing the rate of rotation of the selector plate.

6. A device according to claim 4 in which the selector plate has an upstanding frustoconical central portion serving as a funnel and guiding particulate parasiticidal composition to the openings in the plates.

7. A device according to claim 6 comprising scraper means fixed above the selector plate compelling material carried with rotation of the plate to pass through the aligned openings as the material is carried against the scraper means by the plate.

* * * * *